US006817765B2

United States Patent
Liao

(10) Patent No.: US 6,817,765 B2
(45) Date of Patent: Nov. 16, 2004

(54) STRUCTURE OF A PROTECTION HOOD MECHANISM FOR LINEAR SLIDING RAILS

(76) Inventor: I Tsung Liao, PO Box 82-144, Taipei (TW)

(*) Notice: Subject to any disclaimer, the term of this patent is extended or adjusted under 35 U.S.C. 154(b) by 12 days.

(21) Appl. No.: 10/309,027

(22) Filed: Dec. 4, 2002

(65) Prior Publication Data

US 2003/0161555 A1 Aug. 28, 2003

(30) Foreign Application Priority Data

Feb. 22, 2002 (TW) ........................................ 91202296 U

(51) Int. Cl.[7] ............................................... F16C 29/08
(52) U.S. Cl. ....................................................... 384/15
(58) Field of Search ............................... 384/15, 16, 45

(56) References Cited

U.S. PATENT DOCUMENTS 2,253,846 A * 8/1941 Cornell ........................ 384/15
6,241,230 B1 * 6/2001 Kawaguchi .................. 384/15
6,443,619 B1 * 9/2002 Dutsch ........................ 384/45
6,626,571 B2 * 9/2003 Kato et al. ................... 384/15

* cited by examiner

Primary Examiner—Thomas R. Hannon
(74) Attorney, Agent, or Firm—Leong C. Lei

(57) ABSTRACT

A protection hood mechanism for linear sliding rails is disclosed. The hood mechanism has a sliding seat and a saddle seat, and the sliding rails is provided at the two lateral sides at the top of the sliding seat, characterized in that the bottom face of the saddle seat, corresponding to the sliding rail, is formed into an engaging slot, and the bottom face of the saddle seat, corresponding to the engaging slot, is provided with a resisting block, and the center of each resisting block extended along the engaging slot is formed into a protruded section, such that a partitioned space is formed between the engaging slot and the resisting block, and the space allows the sliding rail protection hood to be inserted, and the two ends of the protection hood are locked to the sliding rail seat, thereby a protection hood for the linear sliding rail is obtained.

1 Claim, 4 Drawing Sheets

STRUCTURE OF A PROTECTION HOOD MECHANISM FOR LINEAR SLIDING RAILS

BACKGROUND OF THE INVENTION

1. Field of the Prior Art

The present invention relates to structure of protection hood mechanism, and in particular, a protection hood for linear sliding rails. A saddle seat makes use of an engaging slot and urging block to form into partitioned space allowing the protection hood to protect the sliding rails and at the same time the protection hood can regulate the unevenness in the course of installation of the sliding rails.

2. Description of the Prior Art

Referring to FIG. 1, there is shown a conventional hood protection mechanism, wherein the saddle seat 15 of the sliding rail seat is mounted with a tapered protection hood 20, 25 so as to protect the sliding rail 11 between the sliding set 10 and the saddle seat 15. Such design requires a plurality of components and the cost of production is high. Further, the device is prone to damages and break down. Due to the existing of gaps, water-proof resistance is poor and there is a possibility that oil or metallic debris will enter the gaps and damage the sliding rail 11. In addition, noise is produced in this case.

FIGS. 2 and 3 show another design to overcome the above drawbacks, wherein the center region of the saddle seat 15 is provided with a through hole 16 for the mounting of a protection hood 30 for the sliding rail 11 of the sliding seat 10. The hood 30 is a plate-like body.

Based on the above design, the drawbacks of the tapered protection hood 20, 25 can be solved, however, as shown in FIG. 3, to provide a through hole 16 at the saddle seat 15 is difficult, and the cost of production is also high. In view of the above, the drawbacks have to be overcome by providing a protection hood for the sliding rail. Accordingly, it is an object of the present invention to provide a structure of a protection hood mechanism for linear sliding rail.

SUMMARY OF THE PRESENT INVENTION

Accordingly, it is an object of the present invention to provide a protection hood mechanism for sliding rails having a sliding seat and a saddle seat, the sliding rails being provided at the two lateral sides at the top of the sliding seat, characterized in that the bottom face of the saddle seat, corresponding to the sliding rail, is formed into an engaging slot, and the bottom face of the saddle seat, corresponding to the engaging slot, is provided with a resisting block, and the center of each resisting block extended along the engaging slot is formed into a protruded section, such that a partitioned space is formed between the engaging slot and the resisting block, and the space allows the sliding rail protection hood to be inserted, and the two ends of the protection hood are locked to the sliding rail seat, thereby a protection hood for the linear sliding rail is obtained.

Yet another object of the present invention is to provide a protection hood for sliding rails, wherein the saddle seat is stable and smooth in the course of movement.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
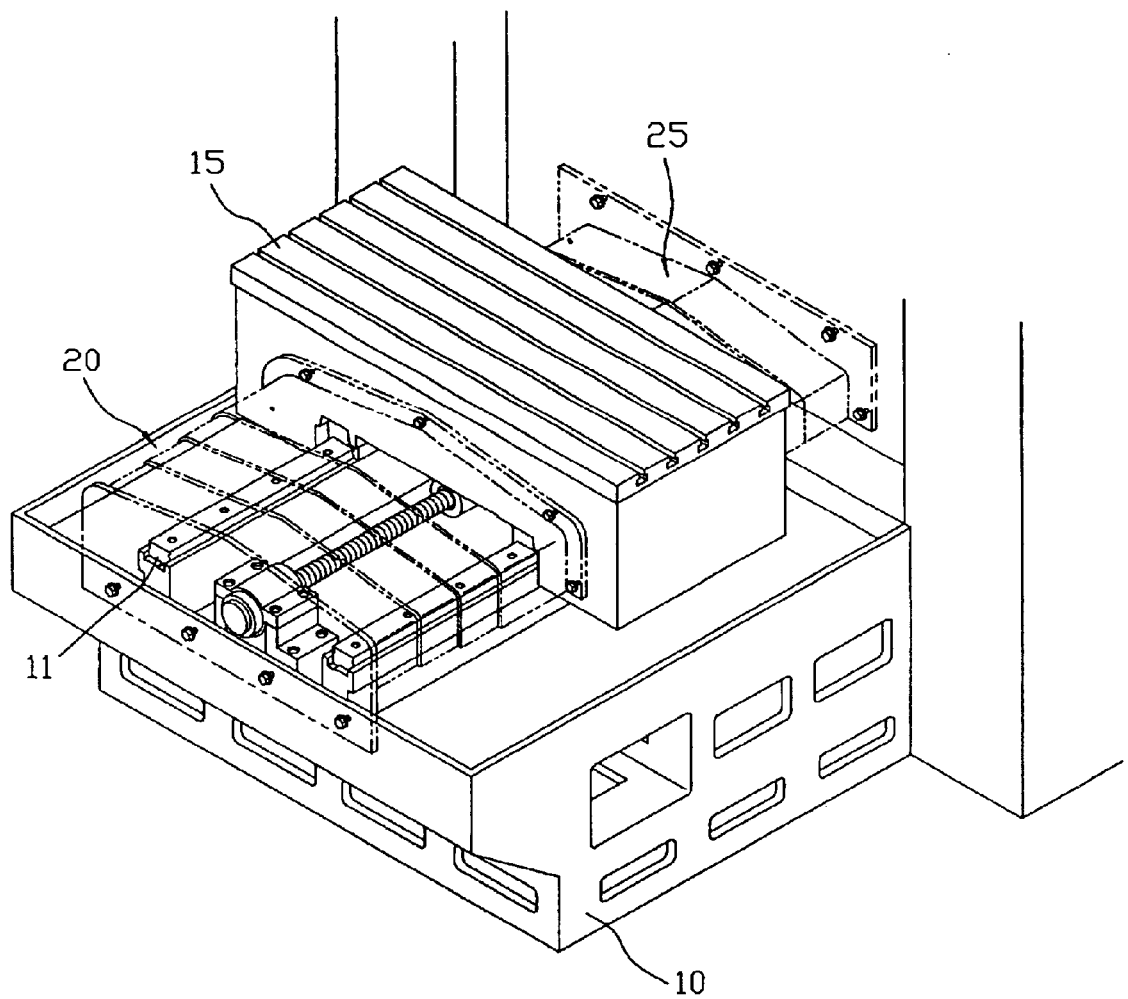
FIG. 1 is a perspective view of a conventional hood protection mechanism for linear sliding rails.
Figure 2:
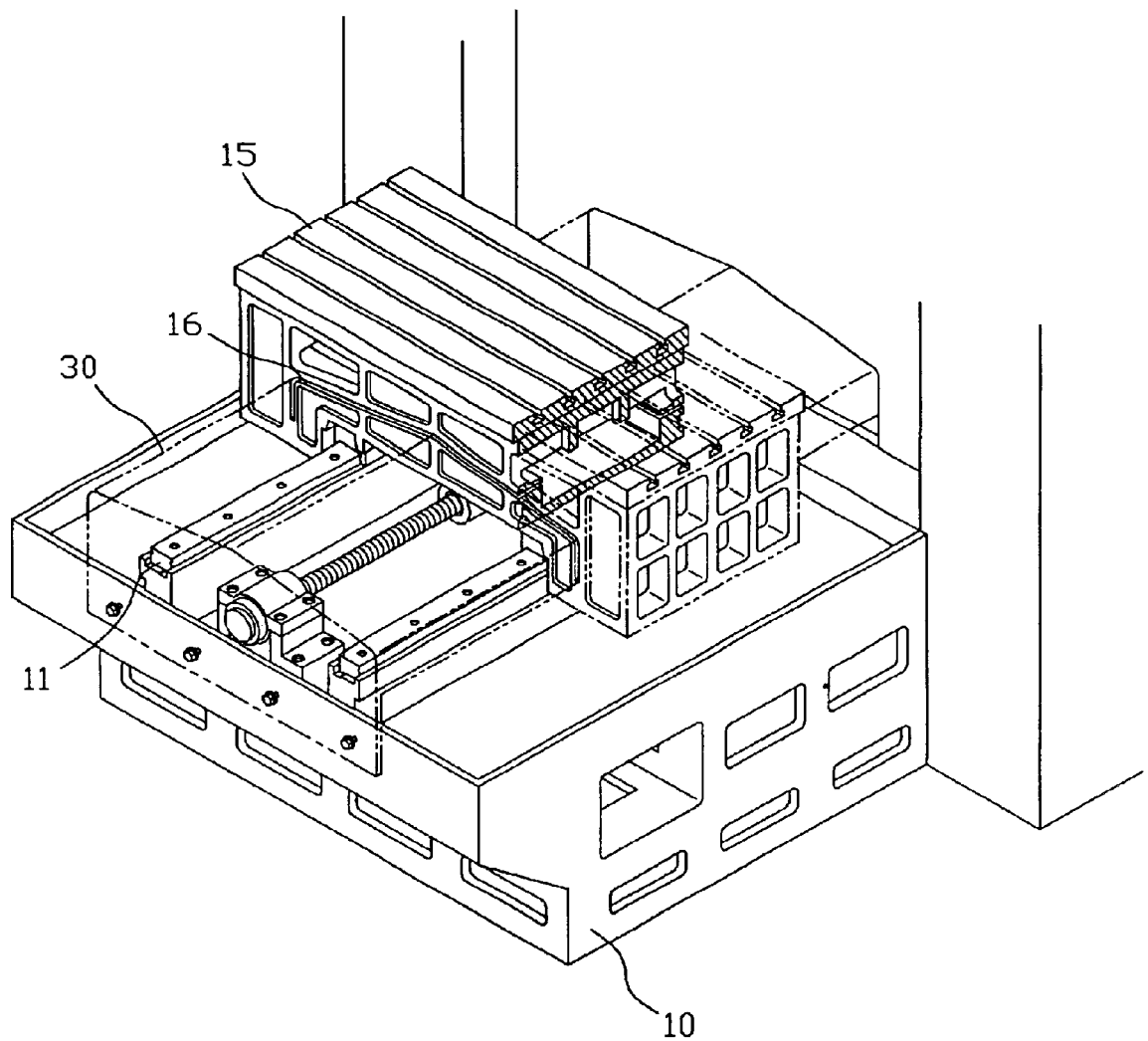
FIG. 2 is a perspective view of another conventional hood protection mechanism for linear sliding rails.
Figure 3:
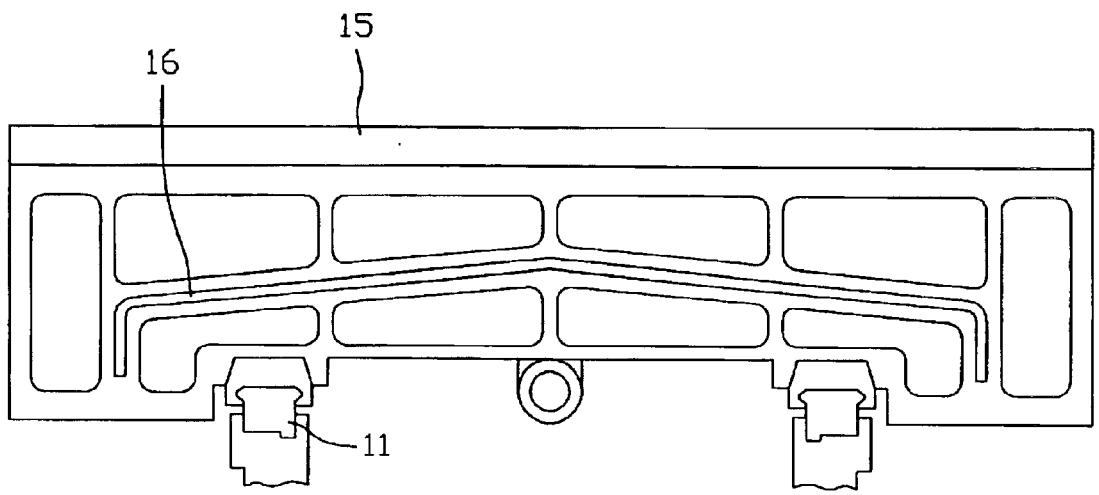
FIG. 3 is a sectional view of the conventional hood protection mechanism for linear sliding rails.
Figure 5:
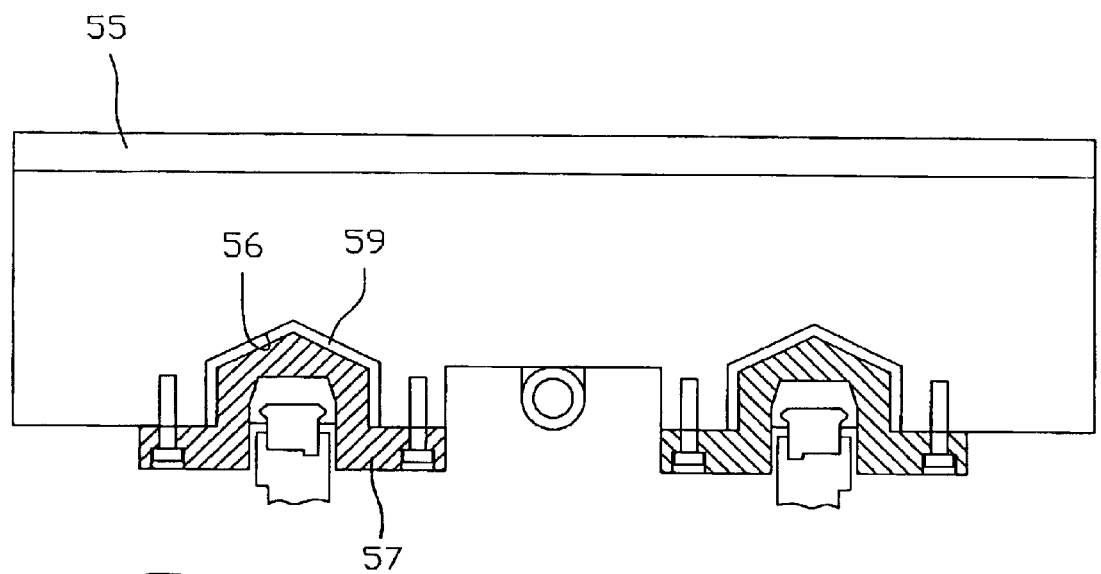
FIG. 5 is a sectional view of the present invention.
Figure 5A:
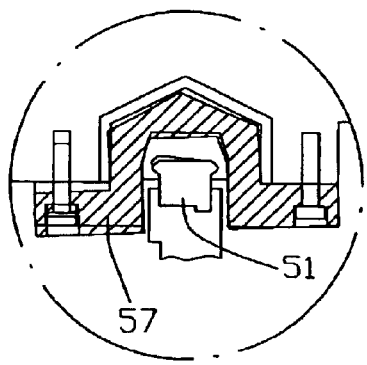
FIG. 5A is a enlarged view of a portion of FIG. 5.
Figure 4:
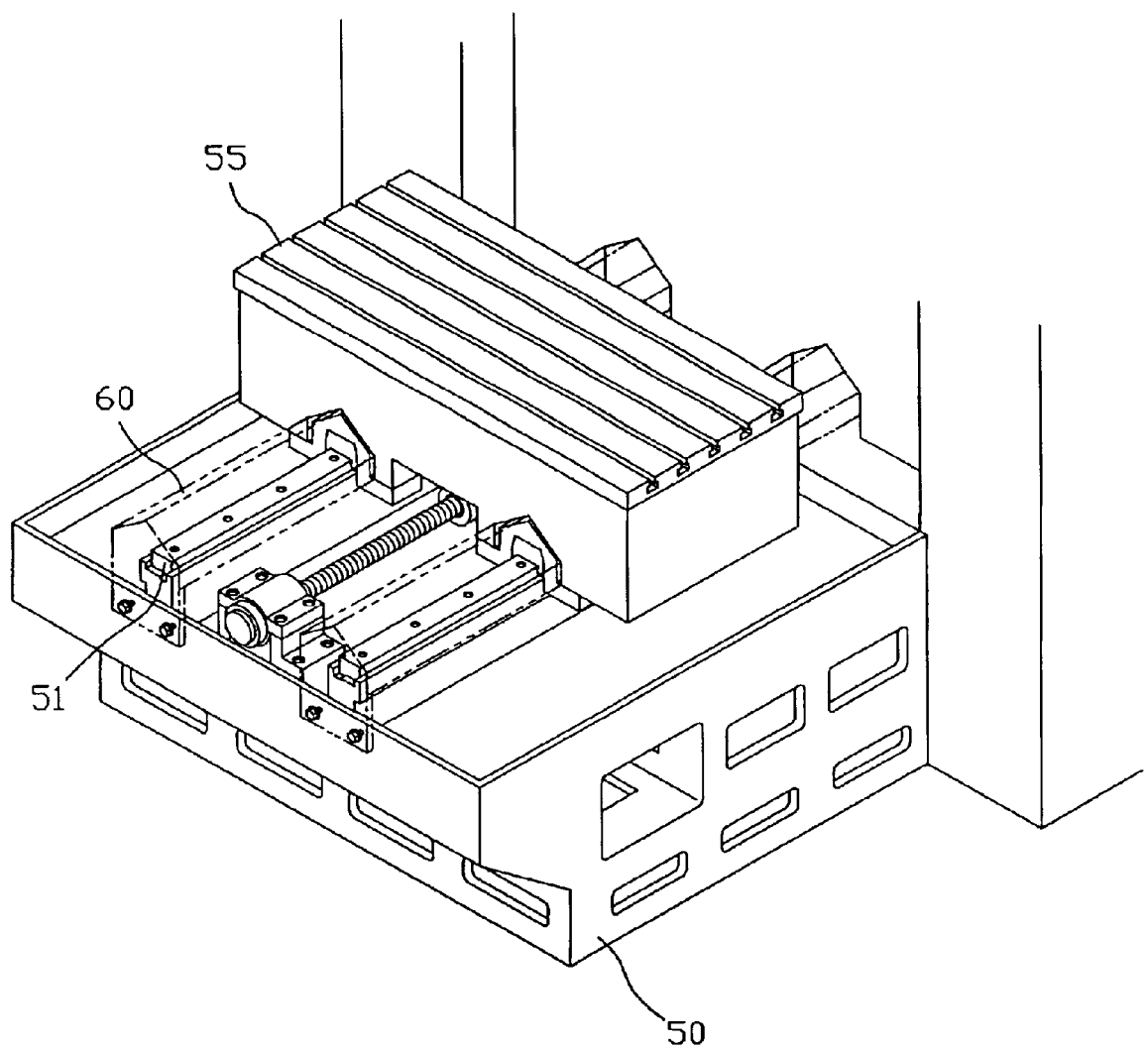
FIG. 4 is a perspective view of the protection hood mechanism for linear sliding rails according to the present invention.

As shown in FIGS. 4, 4A and 5, there is shown a structure of a protection hood for linear sliding rails. In accordance with the present invention, the two sides of the top face of the sliding seat 5 of the protection hood mechanism are provided respectively two sliding rails 51 for a saddle seat 55. The bottom face of the saddle seat 55, corresponding to the sliding rails 51, is formed into an engaging slot 56, and the bottom face of the saddle seat 55, corresponding to the engaging slot 56, is provided with a resisting block 57, and the center of each resisting block 57 extended along the engaging slot 56 is formed into a protruded section, such that a partitioned space 59 is formed between the engaging slot 56 and the resisting block 57, and the space allows the sliding rail protection hood 60 to be inserted, and the two ends of the protection hood 60 are locked to the sliding rail seat 50, thereby a protection linear sliding rail 51 is obtained.

As shown in FIGS. 4 and 5, the protection hood 60 is securely mounted on the top section of the sliding rail 51 which achieves the objective of protection the sliding rail 51. Due to the fact that the protection hood 60 is engaged at the engaging slot 56 of the saddle seat 55, the structure of the saddle seat 55 may not be damaged. As a result, the rigidity of the hood 60 is improved.

More importantly, when installation of the sliding rail 51, if the sliding rails at two lateral sides are not maintained at horizontal, the horizontal position can be adjusted via the lateral height of the resisting block 57 so as to maintain the smoothness and stability of the sliding of the saddle seat 55.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A protection hood mechanism for sliding rails having a sliding seat and a saddle seat, the sliding rails being provided at the two lateral sides at the top of the sliding seat, characterized in that the bottom face of the saddle seat, corresponding to the sliding rail, is formed into an engaging slot, and the bottom face of the saddle seat, corresponding to the engaging slot, is provided with a resisting block, and the center of each resisting block extended along the engaging slot is formed into a protruded section, such that a partitioned space is formed between the engaging slot and the resisting block, and the space allows the sliding rail protection hood to be inserted, and the two ends of the protection hood are locked to the sliding rail seat, thereby a protection hood for the linear sliding rail is obtained.

* * * * *